(12) United States Patent
Chouinard (10) Patent No.: US 11,415,163 B2
(45) Date of Patent: Aug. 16, 2022

(54) EXPANDING RETENTION LOCKING PLUG

(71) Applicant: Rolls-Royce Corporation, Indianapolis, IN (US)

(72) Inventor: Donald G. Chouinard, Westfield, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 769 days.

(21) Appl. No.: 16/245,788

(22) Filed: Jan. 11, 2019

(65) Prior Publication Data
US 2020/0224705 A1    Jul. 16, 2020

(51) Int. Cl.
| F16B 21/14 | (2006.01) |
| F16B 35/04 | (2006.01) |
| F16B 21/20 | (2006.01) |
| F01D 25/00 | (2006.01) |
| F01D 25/24 | (2006.01) |
| F16B 21/18 | (2006.01) |
| F16B 39/36 | (2006.01) |

(52) U.S. Cl.
CPC .......... *F16B 35/045* (2013.01); *F01D 25/00* (2013.01); *F01D 25/243* (2013.01); *F16B 21/14* (2021.08); *F16B 21/20* (2013.01); *F16B 21/18* (2013.01); *F16B 39/36* (2013.01)

(58) Field of Classification Search
CPC .......... F16B 21/12; F16B 21/14; F16B 13/04; F16B 35/005; F01D 25/243; F01D 25/246; F01D 25/28; F05D 2260/31; F05D 2260/36; F05D 2260/37

USPC .................. 411/351, 21, 348, 393
See application file for complete search history.

(56) References Cited

U.S. PATENT DOCUMENTS

| 486,328 | A | * | 11/1892 | Emrich | .................... | F16B 13/04 |
| | | | | | | 411/21 |
| 1,790,841 | A | * | 2/1931 | Rosen | .................... | F16B 13/066 |
| | | | | | | 411/21 |
| 1,926,798 | A | * | 9/1933 | Baumbach | ................. | F16B 2/16 |
| | | | | | | 403/374.4 |
| 2,968,467 | A | * | 1/1961 | McGregor | .............. | F01D 9/042 |
| | | | | | | 415/136 |
| 3,027,201 | A | * | 3/1962 | Blazek | ................. | B62D 55/213 |
| | | | | | | 305/186 |
| 3,319,209 | A | * | 5/1967 | Reyenga | ................ | H01C 10/24 |
| | | | | | | 338/162 |
| 3,877,762 | A | * | 4/1975 | Dennison | .............. | F01D 25/162 |
| | | | | | | 384/441 |
| 4,067,657 | A | * | 1/1978 | Kaarlela | ............... | E02F 9/2841 |
| | | | | | | 403/317 |
| 4,982,763 | A | | 1/1991 | Klahn | | |
| 5,116,176 | A | | 5/1992 | Yousuke | | |
| 5,292,227 | A | * | 3/1994 | Czachor | ................ | F01D 25/162 |
| | | | | | | 415/142 |
| 5,803,689 | A | | 9/1998 | Magnus et al. | | |

(Continued)

*Primary Examiner* — Flemming Saether
(74) *Attorney, Agent, or Firm* — Barnes & Thornburg LLP (57) ABSTRACT

An engine assembly for use with a gas turbine engine includes a first component, a second component, and a retention locking plug. The first component is formed to define a passage that extends into the first component. The second component is received in the passage defined in the first component. The retention locking plug extends into the first component and the second component to couple the second component with the first component.

8 Claims, 4 Drawing Sheets

(56) References Cited

U.S. PATENT DOCUMENTS

| | | | |
|---|---|---|---|
| 7,165,924 B1 | 1/2007 | Breslin et al. | |
| 7,377,137 B1 * | 5/2008 | Bednarz | E05B 63/121 |
| | | | 403/322.2 |
| 7,891,903 B2 | 2/2011 | Klingenberg et al. | |
| 8,720,874 B2 * | 5/2014 | Tschida | F16B 19/109 |
| | | | 269/48.1 |
| 9,028,184 B2 | 5/2015 | Bone | |
| 9,303,674 B2 | 4/2016 | Demmeler | |
| 9,458,737 B2 * | 10/2016 | Roth | F01D 25/243 |
| 9,464,461 B2 * | 10/2016 | Daniels | F41A 17/44 |
| 9,945,413 B2 | 4/2018 | Rice | |
| 10,408,089 B2 * | 9/2019 | McDonagh | F01D 9/065 |
| 2016/0222634 A1 * | 8/2016 | Chiolerio | E02F 9/2833 |

* cited by examiner

EXPANDING RETENTION LOCKING PLUG

FIELD OF THE DISCLOSURE

The present disclosure relates generally to a fastener, and more specifically to a retention plug for coupling together two components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Such vane and wheel assemblies sometimes are formed from several components that are coupled together. Vibrations in the engine and thermal growth mismatch between components may urge the components apart during operation of the gas turbine engine.

SUMMARY

The present disclosure may comprise one or more of the following features and combinations thereof.

A gas turbine engine assembly may include a first component, a second component, and a retention locking plug. The first component may be formed to define a first passage that extends axially into the first component along a plug axis. The second component may be formed to define a second passage that extends axially through the second component along the plug axis. The second component may extend at least partway into the first component. The retention locking plug may couple the first component with the second component.

In some embodiments, the retention locking plug may include a pin, a tack, and a stopper. The pin may be located in the first passage and the second passage and engaged with the first component and the second component. The tack may extend at least partway out of the pin. The stopper may extend at least partway into the pin and engage the tack to urge the tack radially outward relative to the plug axis away from the pin and into engagement with one of the first component and the second component.

In some embodiments, the pin has a first end and a second end. The second end is spaced apart axially from the first end relative to the plug axis. In some embodiments, the pin has an intermediate portion that extends between and interconnect the first end and the second end. In some embodiments, the first end may have a first diameter relative to the plug axis, the second end may have a second diameter, and the intermediate portion may have a third diameter. The second diameter may be smaller than the first diameter. The third diameter may be smaller than the second diameter.

In some embodiments, the pin may be formed to define a stopper-receiver passage and a tack-receiver passage. The stopper passage may extend axially into the first end relative to the plug axis. The tack-receiver passage may extend radially through the first end relative to the plug axis and open into the stopper-receiver passage. The tack may be located at least partway in the tack-receiver passage. The stopper may be located at least partway in the stopper-receiver passage.

In some embodiments, the tack may engage the second component. The second component may have a first hardness value and the tack may have a second hardness value that is greater than the first hardness value of the second component.

In some embodiments, the tack may have a radially inner side and a radially outer side. The radially outer side may be spaced apart radially from the radially inner side relative to the plug axis. The radially outer side may form a point that extends radially outward relative to the plug axis and into the second component. In some embodiments, the radially inner side of the tack may be planar and angled relative to the plug axis such that the radially inner side tapers radially outwardly relative to the plug axis as the radially inner side extends aft relative to the plug axis.

In some embodiments, the tack may include a side surface. The side surface may extend between the radially inner side and the radially outer side of the tack.

In some embodiments, the tack may be formed to include a key. The key may extend away from the side surface and may be received in the pin to orient the tack relative to the pin in a predetermined orientation.

In some embodiments, the first component may be an annular disk. The second component may be a strut that extends radially away from the annular disk.

In some embodiments, the pin may have a first end and a second end spaced apart axially from the first end relative to the plug axis. The first end of the pin may be engaged with the first component and the second component by a first interference fit. The second end of the pin may be engaged with the first component and the second component by a second interference fit.

According to an aspect of the present disclosure, a retention locking plug may include a retainer pin, a tack, and a stopper. The retainer pin may have a first end and a second end spaced apart from the first end relative to a plug axis. In some embodiments, the first end may have a first diameter relative to the plug axis and the second end has a second diameter. The second diameter may be smaller than the first diameter.

In some embodiments, the retainer pin may include an intermediate portion. The intermediate portion may extend between and interconnect the first end and the second end. The intermediate portion may have a third diameter that may be smaller than the second diameter.

In some embodiments, the retainer pin may be formed to define a stopper-receiver passage that extends axially into the first end and toward the second end of the retainer pin and a tack-receiver passage that may extend radially through the first end of the retainer pin and open into the stopper-receiver passage.

In some embodiments, the tack may be located at least partway in the tack-receiver passage. The tack may have a radially inner side and a radially outer side spaced apart radially from the radially inner side relative to the plug axis. The radially outer side may form a point.

In some embodiments, the stopper may be received in the stopper-receiver passage and coupled to the retainer pin for movement therewith. The stopper may be engaged with the radially inner side of the tack to urge the tack radially away from the plug axis.

In some embodiments, the radially inner side of the tack may be planar relative to the plug axis. The radially inner side of the tack may tapered relative to the plug axis.

In some embodiments, the tack includes a side surface that may extend between the radially inner side and the radially outer side of the tack. The tack may be formed to include a key that extends away from the side surface and may be received in the retainer pin to orient the tack relative to the retainer pin in a predetermined orientation.

In some embodiments, the stopper may be formed to define a tool hole. The tool hole may extend axially into the stopper relative to the plug axis and may be configured to receive a tool fitting.

In some embodiments, the stopper may be threaded. The stopper may mate with threads formed in the stopper-receiver passage.

According to the present disclosure, a method may include a number of steps. The method may include providing a first component, a second component, and a retention locking plug that may include a retainer pin, a tack located at least partway in the retainer pin, and a stopper. The method may include inserting the retainer pin into the first component and the second component. The method may include inserting the stopper into a stopper-receiver passage formed in an end of the retainer pin to cause the stopper to engage the tack and urge the tack away from the stopper and into engagement with the second component.

In some embodiments, the method may include cooling the retainer pin relative to the first component and the second component before inserting the retainer pin into the first component and the second component. The method may include heating the retention locking plug to cause the retainer pin to engage the first component and the second component in an interference fit.

In some embodiments, the tack may include a radially outer side and a radially inner side. The radially outer side may be formed to defined a point. The radially inner side may be planar and tapered.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
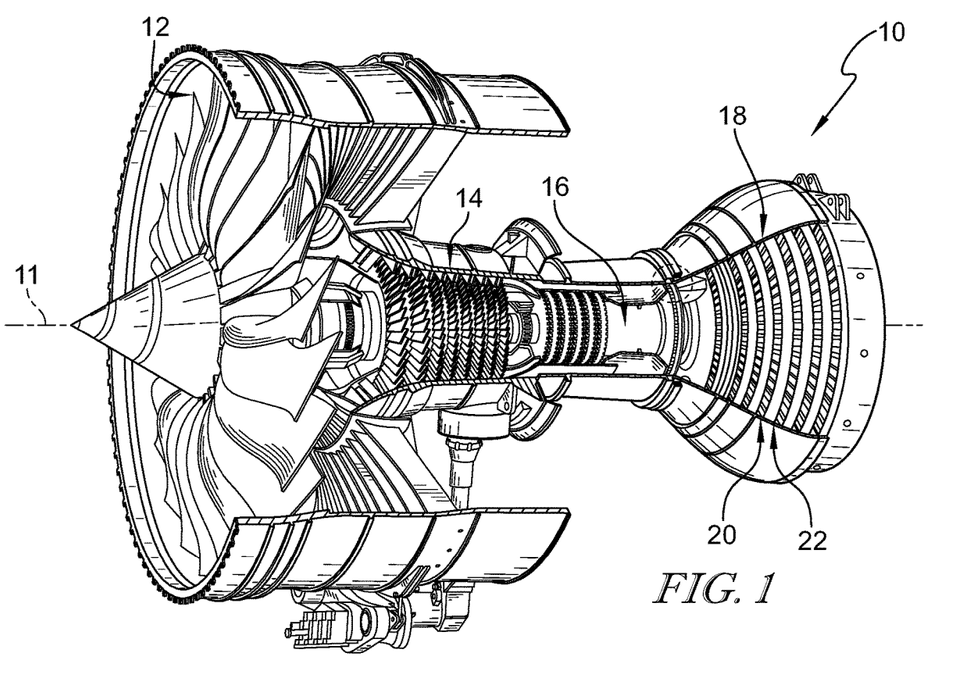
FIG. 1 is a cutaway view of a gas turbine engine that includes a fan, a compressor, a combustor, and a turbine that includes a plurality of turbine wheel assemblies adapted to extract work from hot combustion products received from the combustor and a plurality of turbine vane assemblies adapted to direct the hot combustion products into the turbine wheel assemblies.

A gas turbine engine 10 in accordance with the present disclosure includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12 for powering the aircraft or delivering rotational power to a system.

Figure 2:
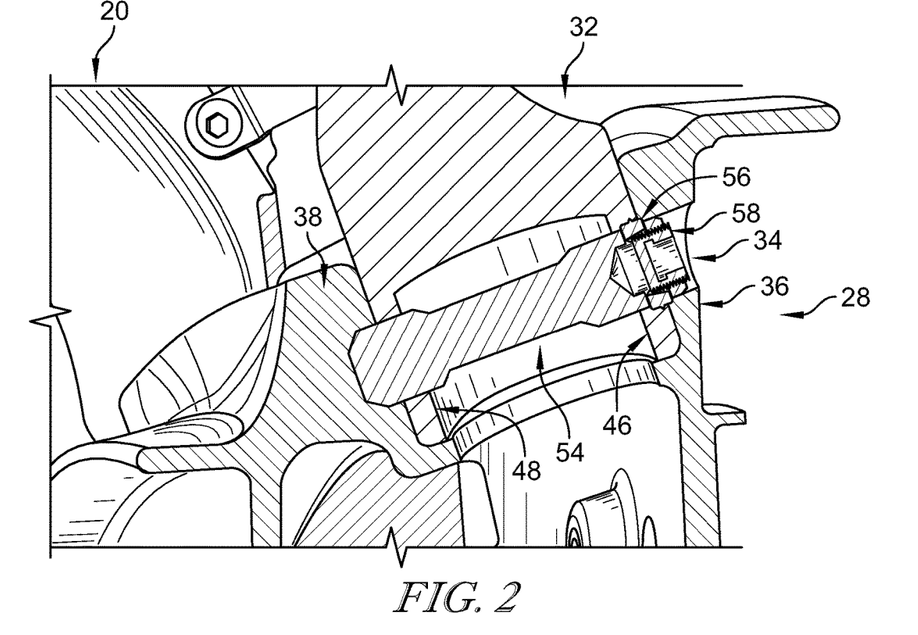
FIG. 2 is a section view of the turbine of FIG. 1 showing an annular disk, a strut that extends radially away from the annular disk, and a retention locking plug that extends into the annular disk and the strut to couple the strut with the disk and suggesting that the retention locking plug is expandable to block the plug from backing out of engagement with the annular disk and strut due to vibrations of the gas turbine engine for example.

The turbine 18 includes a plurality of turbine vane assemblies 20 and turbine wheel assemblies 22 as shown in FIG. 1. A portion of a turbine vane assembly 20 is shown in FIG. 2. The turbine vane assembly 20 extends about a central axis 11 and is located between turbine wheel assemblies 22 to direct gases received from an upstream turbine wheel assembly 22 toward a downstream turbine wheel assembly 22.

Each turbine wheel assembly 22 is configured to interact with the hot combustion gases from the combustor 16 and rotate about the central axis 11 of the gas turbine engine 10 to generate power for driving the compressor 14 and/or the fan 12.

One of the illustrative turbine vane assemblies 20 includes an annular disk 28, a plurality of struts 32, and a plurality of retention locking plugs 34 as suggested in FIG. 2. The annular disk 28 is arranged around the central axis 11. Each strut 32 extends radially away from the disk 28 to provide structural support in the gas turbine engine 10. Each retention locking plug 34 extends into the disk 28 and one of the struts 32 to couple the strut 32 with the annular disk 28 for movement therewith. The vane assembly 20 further includes a plurality of vanes.

Figure 3:
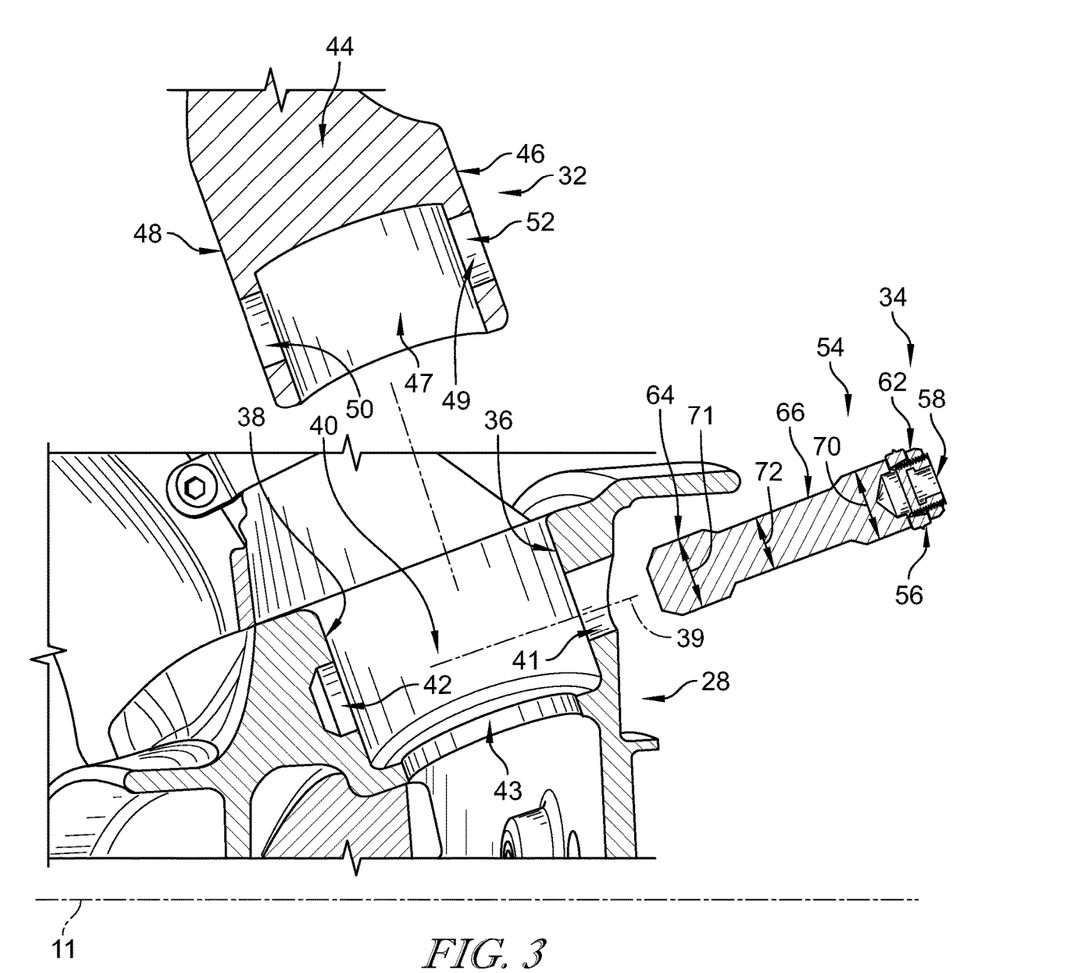
FIG. 3 is an exploded view of the components of FIG. 2 suggesting that the annular disk is formed to include a passage sized to receive the strut and the retention locking plug is configured to extend axially into the strut and the disk.

The annular disk 28 is arranged around the central axis 11 of the gas turbine engine 10 as suggested in FIG. 3. The disk 28 includes a first disk wall 36 and a second disk wall 38 that cooperate to define a first passage 40 that extends radially into the disk 28 as shown in FIG. 3. The second disk wall 38 is located axially aft of the first disk wall 36 relative to the central axis 11. In the illustrative embodiment, the first disk wall 36 and the second disk wall 38 are integrally coupled together to provide a continuous surface that defines the passage 40. In other embodiments, the first disk wall 36 and the second disk wall 38 may be spaced apart circumferentially and may not be coupled directly together.

The disk 28 is made of metallic materials in the illustrative embodiment. The metallic materials of the disk 28 may have a hardness value that is the same as or different than a hardness value of the materials of the strut 32.

In the illustrative embodiment, the first disk wall 36 is formed to include a first through hole 41 and the second disk wall 38 is formed to include a blind hole 42 as shown in FIG. 3. The through hole 41 extends axially through the first disk wall 36 with respect to a plug axis 39. The plug axis 39 is angled relative to the central axis 11. In other embodiments, the plug axis 39 is parallel with the central axis 11. The blind hole 42 extends axially into the second disk wall 38 with respect to the plug axis 39. The holes 41, 42 both open into the first passage 40. Additionally, a second through hole 43 extends through a bottom surface of the passage 40 and opens into the passage 40. In other embodiments, hole 42 is a through hole that extends through the second disk wall 38.

The strut 32 includes a strut body 44, a first strut wall 46, and a second strut wall 48 as shown in FIG. 3. The strut body 44 extends radially away from the disk 28 to provide structural support in the gas turbine engine 10. The first and second strut walls 46, 48 extend from a radially inner end of the strut body 44 and cooperate to define an interior region 47. The second strut wall 48 is axially spaced from the first strut wall 46 relative to the central axis 11.

In the illustrative embodiment, the first strut wall 46 and the second strut wall 48 are integrally coupled together to provide a continuous surface that defines the interior region 47. In other embodiments, the first disk wall 36 and the second disk wall 38 may be spaced apart circumferentially and may not be coupled directly together.

In the illustrative embodiment, the first strut wall 46 is formed to include a strut hole 49 and the second strut wall 48 is formed to include a strut hole 50 as shown in FIG. 3. The strut holes 49, 50 extend axially through the first and second strut walls 46, 48 with respect to the plug axis 39 and open into the interior region 47 to define a portion of the plug-receiver passage 52. The plug-receiver passage 52 is formed by the holes 41, 43, the strut holes 49, 50, the passage 40, and the interior region 47 so that the plug-receiver passage 52 extends axially through the disk 28 and the strut 32 relative to the plug axis 39.

The retention locking plug 34 is received in the plug-receiver passage 52 and couples the disk 28 with the strut 32 as suggested in FIGS. 2 and 3. The retention locking plug 34 includes a retainer pin 54, tacks 56, and a stopper 58 as shown in FIGS. 3-9. The retainer pin 54 engages the disk 28 and the strut 32 to couple the strut 32 with the disk 28. The tacks 56 are located at least partway in tack-receiver passages 60 of the retainer pin 54 and have a second hardness value. The stopper 58 is received in a stopper-receiver passage 61 formed in the retainer pin 54 and coupled to the retainer pin 54 for movement therewith.

Figure 4:
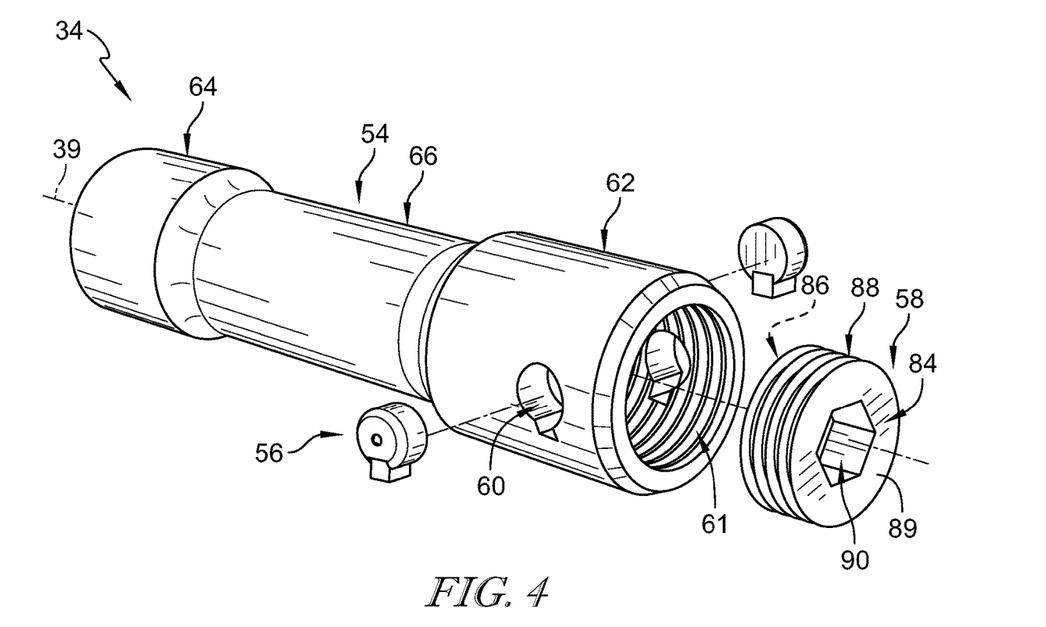
FIG. 4 an exploded view of the retention locking plug of FIG. 3 showing that the retention locking plug includes a pin, tacks, and a stopper and showing that the tacks are configured to be received in a tack-receiver passages formed in the pin and the stopper is configured to be receive in a stopper-receiver passage formed in the pin to urge the tacks outward away from the pin and into the strut.
Figure 5:
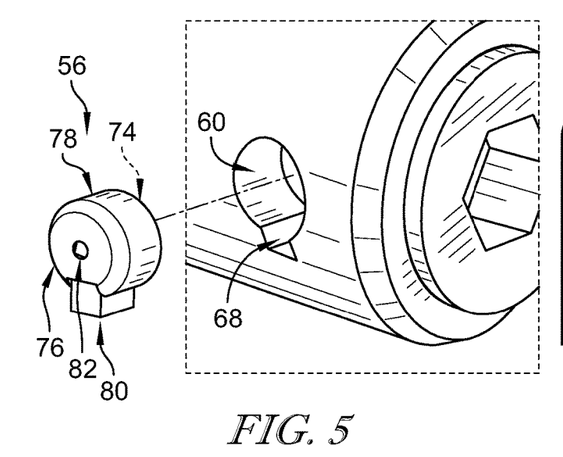
FIG. 5 is a detail view of the retention locking plug of FIG. 4 showing that each tack includes a key that is configured to be received in a key feature formed in the pin to orient the tack relative to the pin in a predetermined orientation.

The retainer pin 54 has a first end 62, a second end 64, and an intermediate portion 66 as shown in FIGS. 3 and 4. The second end 64 is spaced apart axially from the first end 62 relative to the plug axis 39. The intermediate portion 66 extends between and interconnects the first end 62 and the second end 64. The retainer pin 54 is formed to define the stopper-receiver passage 61 that extends axially into the first end 62 of the pin 54 toward the second end 64 of the pin 54. The retainer pin 54 is also formed to define the tack-receiver passages 60 that extend radially relative to the plug axis 39 through the first end 62 of the retainer pin 54 and open into the stopper-receiver passage 61. In the illustrative embodiment, the tack-receiver passage 60 is shaped to form a key-receiver feature 68 as shown in FIG. 5. The first end 62 of the pin 54 is press fit into engagement with the strut 32 and the disk 28 to couple the strut 32 with the disk 28. The second end 64 of the pin 54 is press fit into engagement with the strut 32 and the disk 28 to couple the strut 32 with the disk 28.

In the illustrative embodiment, the first end 62 of the pin 54 has a first diameter 70 relative to the plug axis 39 as shown in FIG. 3. The second end 64 has a second diameter 71 relative to the plug axis 39 that is smaller than the first diameter 70. The intermediate portion 66 has a third diameter 72 relative to the plug axis 39 that is smaller than the second diameter 71. The pin 54 tapers from the first end 62 to the intermediate portion 66 and tapers from the second end 64 to the intermediate portion 66. The second end 64 is tapered at its forward tip and the first end 62 is tapered at its aft tip. The pin 54 is solid except for the tack-receiver passages 60 and the stopper-receiver passage 61.

Figure 6:
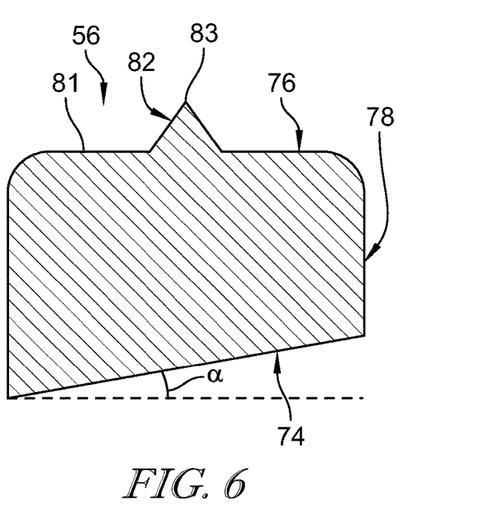
FIG. 6 is a section view of the tack of FIG. 5 showing that the tack includes a radially inner side that is planar and tapered so as to be urged outwardly away from the pin by the stopper as the stopper is inserted into the pin and a radially outer side spaced apart from the radially inner side and shaped to form a point for engaging the strut.

Each tack 56 includes a radially inner side 74, a radially outer side 76, a side surface 78, and a key 80 as shown in FIGS. 5 and 6. The radially outer side 76 is spaced apart radially from the radially inner side 74 relative to the plug axis 39. The side surface 78 extends between the radially inner side 74 and the radially outer side 76 of the tack 56. The key 80 extends away from the side surface 78 and is received in the key-receiver feature 68 of the retainer pin 54 to orient the tack 56 relative to the retainer pin 54 in a predetermined orientation.

In the illustrative embodiment, the radially inner side surface 74 is planar and tapered as shown in FIG. 6. The radially inner side surface 74 is planar and tapered relative to the plug axis 39 such that an angle alpha is defined between the radially inner side 74 of the tack 56 and the plug axis 39. The angle alpha is between about 1 and about 15 degrees in some embodiments. In the illustrative embodiment, the angle alpha is about 5 degrees.

In the illustrative embodiment, the radially outer side 76 of the tack 56 includes an outer planar surface 81 and a protrusion 82. The protrusion 82 extends radially outward from the planar surface 81 with respect to the plug axis 39. In the illustrative embodiment, the protrusion 82 forms a point 83. In other embodiments, the radial outer side 76 may have any other suitable shape that defines a point.

The stopper 58 includes a first end 84, a second end 86, and a radially outer surface 88 as shown in FIG. 4. The second end 86 is spaced apart axially from the first end 84 relative to the plug axis 39. The radially outer surface 88 of the stopper 58 extends between and interconnects the first end 84 and the second end 86. In the illustrative embodiment, the radially outer surface 88 of the stopper 58 is threaded.

The first end 84 of the stopper 58 is formed to include an outer stopper surface 89 and a blind tool hole 90. The blind tool hole 90 extends from the outer stopper surface 89 and axially into the first end 84 relative to the plug axis 39. The tool hole 90 is hexagonal shaped in the illustrative embodiment; however the tool hole 90 may be any suitable shape. The tool hole 90 is shaped to receive a tool fitting such as a hex head, straight head, Philips, etc. so that the stopper 58 may be rotated and screwed into the first end 62 of the pin 54.

Figure 7:
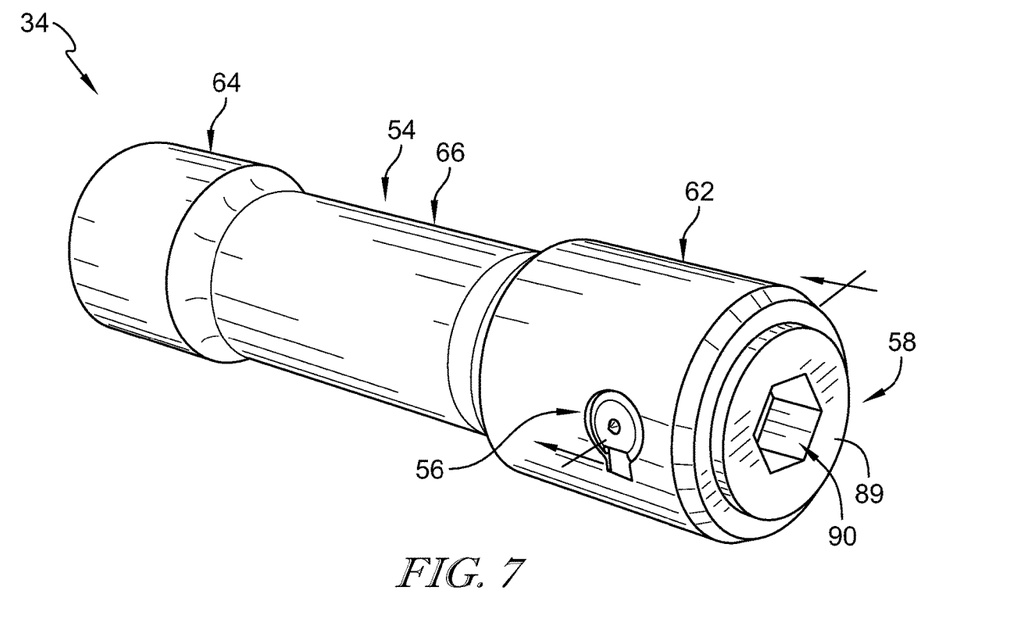
FIG. 7 is perspective view of the retention locking plug of FIG. 2 showing the tacks in the tack-receiver passages and the stopper located partway in the stopper-receiver passage so that the tacks are not yet urged away from the pin to allow the retention locking plug to be inserted into the annular disk and the strut.
Figure 8:
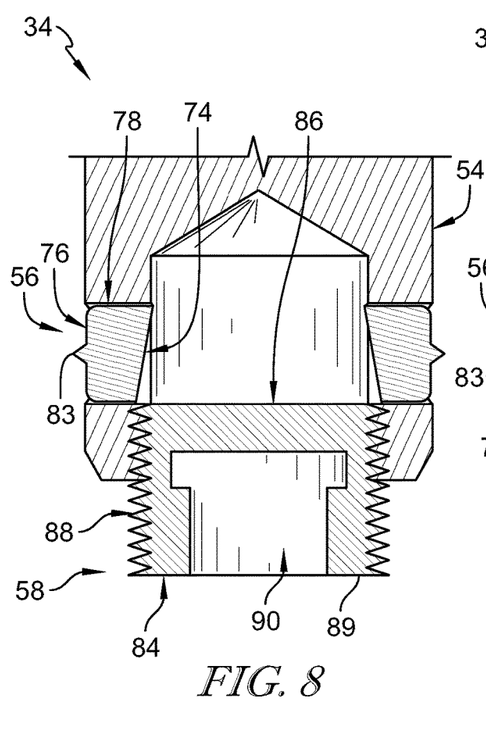
FIG. 8 is a section view of a portion of the retention locking plug of FIG. 7 showing the tacks in the tack-receiver passages and the plug partway inserted in the stopper-receiver passage so that the tacks are not yet urged away from the pin to allow the retention locking plug to be inserted into the annular disk and the strut.
Figure 9:
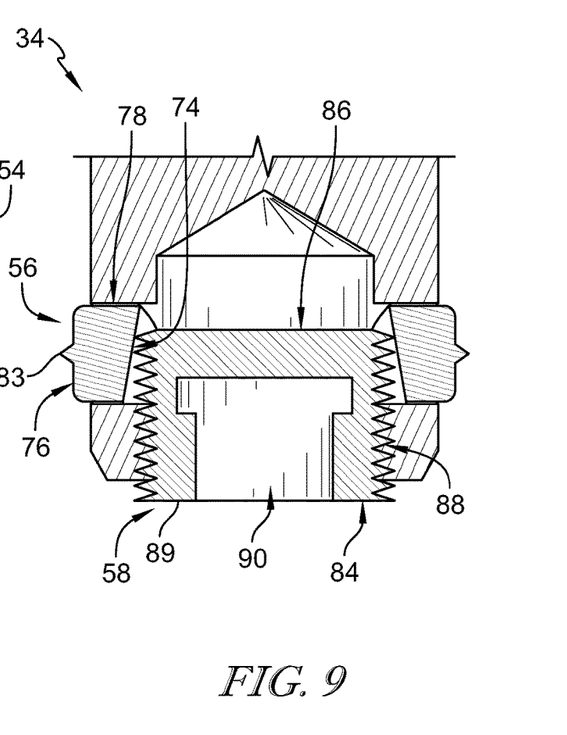
FIG. 9 is a view similar to FIG. 8 showing the stopper inserted in the stopper-receiver passage and engaging the tacks to urge the tacks outward away from the pin so that the tacks may engage the annular disk or strut and block the retention locking plug from backing out of engagement with the strut and the annular disk.

In the illustrative embodiment, the stopper 58 is engaged with the radially inner side 74 of the tacks 56 to urge the tacks 56 radially away from the plug axis 39 and toward the strut 32 adjacent the retention locking plug 34 as suggested in FIGS. 7-9. The second hardness value of the tacks 56 is greater than the first hardness value of the strut 32 so that the tacks 56 indent the strut 32 and lock the retention locking plug 34 in place relative to the disk 28 and the strut 32, and thus coupling the disk 28 with the strut 32.

Vibrations of the gas turbine engine 10 and/or thermal expansion caused during operation of the gas turbine engine 10 may urge the retention locking plug 34 out of the plug-receiver passage 52 such that the strut 32 would be at risk of uncoupling from the disk 28. The tacks 56 indent the strut 32 and lock the retention locking plug 34 in place relative to the disk 28 and the strut 32. As a result, the tacks 56 block the retention locking plug 34 from backing out of the plug-receiver passage 52.

A method of coupling the strut 32 to the annular disk 28 may include several steps. The method includes inserting the first and second strut walls 46, 48 of the strut 32 into the passage 40 formed in the disk 28 so that the holes 49, 50 formed in the strut 32 are aligned with the holes 41, 42 formed in the disk 28 to provide the plug-receiver passage 52. The method includes cooling the retention locking plug 34 relative to the strut 32 and the annular disk 28. The retention locking plug 34 may be cooled using liquid nitrogen or any other suitable cooling method.

The retention locking plug 34 is inserted into plug-receiver passage 52 after the retention locking plug 34 is cooled by first translating along plug axis 39 the second end 64 into the holes 41, 49 and then into the holes 50, 42 until the second end 64 of the retention locking plug 34 is aligned axially with the disk 28 and the strut 32 relative to the plug axis 39. The diameter of the second end 64 is smaller than a diameter of the holes 41, 49 when the retention locking plug 34, strut 32, and disk 28 are at a same temperature. The diameter of the second end 64 is less than a diameter of the holes 42, 50 when the retention locking plug 34 is cooler than the strut 32 and disk 28. The diameter of the second end 64 is greater than a diameter of the holes 42, 50 when the retention locking plug 34, strut 32, and disk 28 are at the same temperature so that the second end 64 is interference fit into engagement with the disk 28 and the strut 32. In other embodiments, the retention locking plug 34 is press fit into position without cooling the retention locking plug 34.

The first end 62 of the retention locking plug 34 is received in the holes 41, 49 and is aligned axially with the disk 28 and the strut 32 relative to the plug axis 39. The diameter of the first end 62 is smaller than a diameter of the holes 41, 49 when the retention locking plug 34 is cooler than the strut 32 and disk 28. The diameter of the first end 62 is greater than a diameter of the holes 41, 49 when the retention locking plug 34, strut 32, and disk 28 are at a same temperature so that the first end 62 is interference fit into engagement with the disk 28 and the strut 32.

The method further includes inserting the stopper 58 into the stopper-receiver passage 61 formed in the first end 62 of the pin 54. The stopper 58 is inserted into the stopper-receiver passage 61 to cause the stopper 58 to engage the tacks 56 and urge the tacks 56 into the strut 32. The method includes indenting the surface of the first strut wall 46 of the strut 32 with the point 83 of the tacks 56 when the tacks 56 of the retention locking plug 34 are urged into the strut 32 to block axial movement of the retention locking plug 34.

The method further includes heating the retainer pin. Heating the retainer pin includes allowing the retention locking plug 34 to reach room temperature due to ambient air temperatures or actively heating the pin with a heat source. The retention locking plug 34 heated so that the first end 62 of the retention locking plug 34 is engaged with the first disk wall 36 of the disk 28 and the first strut wall 46 of the strut 32 by an interference fit and the second end 64 of the retention locking plug 34 is engaged with the second disk wall 38 of the disk 28 and the second strut wall 48 of the strut 32 an interference fit as shown in FIG. 2.

The present disclosure aims to provide a solution to coupling a strut to an annular disk for use in a gas turbine engine. The pin uses a secondary retention feature to block the pin from backing out of its interference fit. In some embodiments, the assembly includes a cover plate that is bolted to the aft side of a torsion box.

The present disclosure retains the strut pin with an internal plug that has multiple tapered pins internal of the high pressure and intermediate pressure cross pin. As the pipe thread plug pin is installed in the cross pin, dog pins (tacks) expand out and provide a secondary retention feature for the cross pin. As such, a cover plate and hardware may not be used to retain the cover plate. The pipe fitting provides the interference fit to retain the pipe plug.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising
a first component formed to define a first passage that extends axially into the first component along a plug axis,
a second component formed to define a second passage that extends axially through the second component along the plug axis, the second component extends at least partway into the first component, and
a retention locking plug that couples the first component with the second component, the retention locking plug includes a pin located in the first passage and the second passage and engaged with the first component and the second component, a tack that extends at least partway out of the pin, and a stopper that extends at least partway into the pin and engages the tack to urge the tack radially outward relative to the plug axis away from the pin and into engagement with one of the first component and the second component, wherein the pin has a first end and a second end spaced apart axially from the first end relative to the plug axis, the first end of the pin is engaged with the first component and the second component by a first interference fit, and the second end of the pin is engaged with the first component and the second component by a second interference fit.

2. The gas turbine engine assembly of claim 1, wherein the pin is formed to define a stopper-receiver passage that extends axially into the first end relative to the plug axis and a tack-receiver passage that extends radially through the first end relative to the plug axis and opens into the stopper-receiver passage, the tack is located at least partway in the tack-receiver passage, and the stopper is located at least partway in the stopper-receiver passage.

3. The gas turbine engine assembly of claim 1, wherein the tack engages the second component, the second component has a first hardness value, and the tack has a second hardness value that is greater than the first hardness value of the second component.

4. The gas turbine engine assembly of claim 3, wherein the tack has a radially inner side and a radially outer side spaced apart radially from the radially inner side relative to the plug axis and the radially outer side forms a point that extends radially outward relative to the plug axis and into the second component.

5. The gas turbine engine assembly of claim 4, wherein the radially inner side of the tack is planar and angled relative to the plug axis such that the radially inner side tapers radially outwardly relative to the plug axis as the radially inner side extends aft relative to the plug axis.

6. The gas turbine engine assembly of claim 1, wherein the first component is an annular disk and the second component is a strut that extends radially away from the annular disk.

7. The gas turbine engine assembly of claim 1, wherein the pin has an intermediate portion that extends between and interconnects the first end and the second end, the first end has a first diameter relative to the plug axis, the second end has a second diameter that is smaller than the first diameter, and the intermediate portion has a third diameter that is smaller than the second diameter.

8. A gas turbine engine assembly comprising a first component formed to define a first passage that extends axially into the first component along a plug axis, a second component formed to define a second passage that extends axially through the second component along the plug axis, the second component extends at least partway into the first component, and a retention locking plug that couples the first component with the second component, the retention locking plug includes a pin located in the first passage and the second passage and engaged with the first component and the second component, a tack that extends at least partway out of the pin, and a stopper that extends at least partway into the pin and engages the tack to urge the tack radially outward relative to the plug axis away from the pin and into engagement with one of the first component and the second component, wherein the tack engages the second component, the second component has a first hardness value, and the tack has a second hardness value that is greater than the first hardness value of the second component, wherein the tack has a radially inner side and a radially outer side spaced apart radially from the radially inner side relative to the plug axis and the radially outer side forms a point that extends radially outward relative to the plug axis and into the second component, wherein the tack includes a side surface that extends between the radially inner side and the radially outer side of the tack and the tack is formed to include a key that extends away from the side surface and is received in the pin to orient the tack relative to the pin in a predetermined orientation.

\* \* \* \* \*